Oct. 14, 1930.  L. F. HOWARD  1,778,528

CAR RETARDER

Filed June 20, 1928

INVENTOR:
L. F. Howard,
by A. L. Vincill
His attorney.

Patented Oct. 14, 1930

1,778,528

UNITED STATES PATENT OFFICE

LEMUEL F. HOWARD, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA

CAR RETARDER

Application filed June 20, 1928. Serial No. 286,971.

My invention relates to car retarders, and particularly to car retarders of the type comprising braking bars located in the trackway adjacent a track rail and arranged to be moved at times into engagement with a part of a railway vehicle.

I will describe one form of car retarder embodying my invention, and one modification thereof, and will then point out the novel features thereof in claims.

Figure 1:
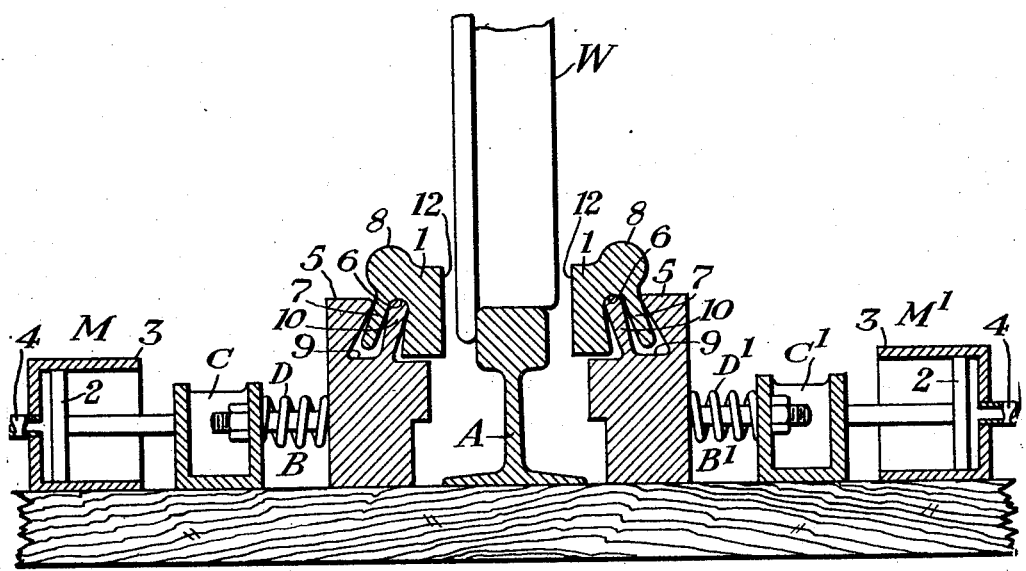
Figure 2:
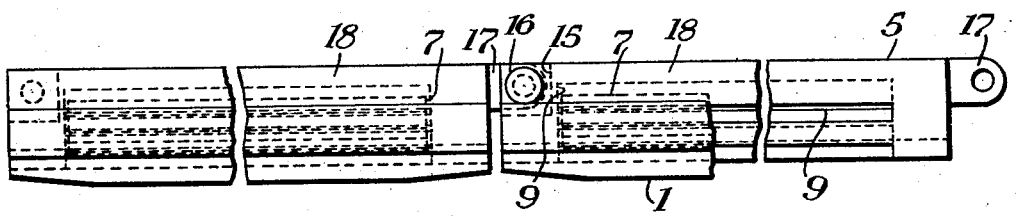
Figure 3:
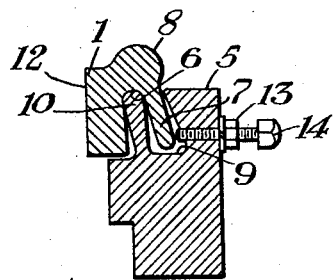

In the accompanying drawing, Fig. 1 is a view showing, in vertical cross section, one form of car retarder embodying my invention. Fig. 2 is a top plan view of a portion of the car retarder illustrated in Fig. 1, with part of a shoe 1 broken away to show the construction. Fig. 3 is a sectional view showing a modified form of a portion of the car retarder illustrated in Fig. 1.

Similar reference characters refer to similar parts in each of the three views.

Referring first to Fig. 1, the reference character A designates one rail of a stretch of railway track. Associated with the rail A is a car retarder comprising two braking bars B and $B^1$, located on opposite sides of the rail A. Each of the braking bars comprises a brake beam 5 and a brake shoe 1. Each brake beam 5 is provided with a longitudinally extending groove 9 and a longitudinally extending rib 10, both of which are inclined obliquely upward toward the rail A. Each brake shoe 1 is provided with a downwardly extending lip 7 which fits within the groove 9, and with a socket 6 which receives the rib 10 of the associated beam.

The brake beam 5 of bar B is operatively connected with a channel C by means including a spring D. The channel C is operated by a motor device M, here shown as a cylinder 3 containing a reciprocable piston 2 connected with the channel C. Fluid pressure, usually air, is at times supplied to the cylinder 3 through a pipe 4 to move the channel C, and therefore the beam 5 of bar B, toward the rail. A similar fluid pressure motor device $M^1$ operates the channel $C^1$ to move beam 5 of bar $B^1$ toward the rail. The supply of fluid pressure to the motor devices M and $M^1$ is controlled by any suitable means not shown in the drawing.

The parts are so proportioned that when motor devices M and $M^1$ are both supplied with fluid pressure to urge beams 5 inwardly, braking faces 12 of the brake shoes 1 engage the sides of a wheel W of a car passing along the rail A. One purpose of the springs D and $D^1$ is to limit the pressure exerted upon the sides of the wheel to the force transmitted by the springs.

When one of the braking bars is being urged into engagement with the side of a car wheel, it will be manifest that the point of application of the force applied to the brake beam 5 is lower than the point of reaction established by contact of the brake shoe 1 with the car wheel; and a couple is therefore created which tends to produce rotation of the brake beam about an axis parallel to its length. To permit a slight amount of this rotation without causing the engaging face 12 of the brake shoe 1 to engage the flange of the car wheel at an angle with the plane of the wheel, I make the groove 9 in each brake beam 5 wider at the bottom than at the top, and I construct each rib 10 with a rounded upper face and with a smaller cross section at the bottom than at the top of the rib. Furthermore, the portion of socket 6 which engages the upper face of rib 10 is also rounded. With the parts constructed in this manner, the brake shoe 1 can rotate through a slight arc about the rounded upper face of the rib 10; and the brake shoe 1 is therefore self aligning, that is to say, the engaging face 12 of the shoe remains parallel to the plane of the car wheel which it engages.

In one form of car retarder embodying my invention, the braking bars are each made up of a plurality of sections, two of which sections are shown in Fig. 2. Each section is designated by the reference character 18 and is provided with a tongue 17 which enters a jaw 15 in the confronting end of the adjacent section 18. By means of a pin 16, each tongue 17 is pivotally connected with the adjacent jaw, so that, with this articulated construction, a car wheel will not bind or jam in passing from one section of the braking bar to the next section.

It will be apparent that a rotating car wheel, engaging with a brake shoe 1, at times tends to lift one end of the shoe vertically upward and to slide the shoe along the brake beam in the direction of motion of the car. Vertical displacement of the shoe is prevented however, by the angular disposition of the dovetailed parts because if the shoe rises it forces the beam outwardly against the pressure which applies the brakes. To prevent horizontal displacement of the brake shoe, I construct the groove 9 of the brake beam 5 (as best shown in Fig. 2) only a little longer than the lip 7 on the shoe. The ends of the lip 7 therefore engage the ends of the grooves 9 and prevent the shoe from sliding along the brake beam. As here shown each shoe extends the full length of the beam, but it is obvious that the shoe could be made in several sections each having a lip fitting in a separate groove in the beam.

When the brake shoes 1 are not engaging the sides of a car wheel, however, the brake shoes are held in place by the force of gravity, and a brake shoe 1 may be quickly and easily removed by drawing the brake shoe 1 away from the brake beam 5 in a plane parallel to the plane of the rib 10.

In the operation of car retarders of the type described, it might happen that the wheels of a light car would be pinched out from between the brake shoes. Should this occur, the wheels might be forced completely over the braking bars and would then drop down on the mechanism and might cause considerable damage to the car retarder apparatus and to the car. I therefore, provide a horizontally extending rounded shoulder 8 on the upper face of each brake shoe 1. The shoulder 8 serves to prevent the car wheels from leaving the top of the shoe if they are pinched out from between the shoes, and the shoulder 8 further serves to strengthen the brake shoe 1 mechanically.

It should be pointed out that while I have shown car retarder apparatus associated with only one track rail, both track rails will usually be provided with car retarder apparatus similar to that here shown.

Referring now to Fig. 3, the brake beam 5 is provided with a threaded bolt 14 which extends into the lower part of the groove 9 to engage the side of the lip 7 which is farthest away from the track rail. The bolt 14 is provided with a lock nut 13 to lock the bolt in place. By adjusting the bolt 14, it is possible to adjust the length of the arc through which the brake shoe can rotate.

Although I have herein shown and described only one form of car retarder embodying my invention and one modification thereof, it is understood that various changes and modifications may be made therein without departing from the spirit and scope of my invention.

Having thus described my invention, what I claim is:

1. A car retarder comprising a brake beam, a brake shoe supported by said beam and prevented solely by the force of gravity from rising out of place on the beam, means operative on said beam for at times urging said shoe into engagement with a car wheel, and means for preventing relative longitudinal movement of the shoe and beam when the shoe is in engagement with said wheel.

2. A railway car retarder comprising a brake beam disposed parallel with a track rail and provided with a longitudinal rib extending obliquely upward toward said rail, a brake shoe having a longitudinally extending socket receiving said rib, and operating mechanism connected with said beam for urging said shoe into engagement with a car wheel.

3. A braking bar for a car retarder comprising a brake beam provided with a longitudinally extending rib having a rounded upper face, and a brake shoe having a socket provided with a rounded bearing surface receiving said rib.

4. A braking bar for a car retarder comprising a brake beam provided with a longitudinally extending groove and a longitudinally extending rib both inclined obliquely upward, and a brake shoe having a lip fitting within said groove and a socket receiving said rib.

5. A railway car retarder comprising a brake beam disposed parallel with a track rail and provided with a longitudinally extending groove inclined obliquely upward and narrower at the top than at the bottom, a longitudinally extending rib integral with said beam and having a rounded upper face and a narrower cross section at the bottom than at the top and forming one side of said groove, a brake shoe having a socket provided with a rounded bearing surface to receive said rib, and a downwardly extending lip integral with said shoe and fitting within said groove.

6. A railway car retarder comprising a brake beam disposed parallel with a track rail and provided with a longitudinal rib and a longitudinal groove both extending obliquely upward toward said rail, a brake shoe having a longitudinally extending socket receiving said rib and a longitudinally extending lip fitting within said groove, a threaded bolt screwed through said beam into said groove and engaging said lip, a lock nut screwed on said threaded bolt, and operating mechanism connected with said beam for urging said shoe into engagement with a car wheel.

7. A car retarder comprising a brake beam, a brake shoe supported by said beam and normally held in place by the force of gravity, driving means operative on said beam for at times urging said shoe into engagement with a car wheel, and means for preventing vertical displacement of the shoe when the shoe is in engagement with said wheel.

8. A railway car retarder comprising a brake beam disposed parallel with a track rail and provided with a longitudinal groove which extends obliquely upward and which ends a short distance from either end of the beam, a longitudinal rib integral with said beam and forming one side of said groove, a brake shoe having a longitudinal socket receiving said rib and a longitudinal lip substantially the same length as said groove and fitting within said groove, and operating mechanism connected with said beam for urging said shoe into engagement with a car wheel.

9. A car retarder comprising a brake beam, a brake shoe supported by said beam and normally held in place by the force of gravity, driving means operative on said beam for at times urging said shoe into engagement with a car wheel, and means effective if said shoe is moved vertically upward to urge the beam against said driving means.

In testimony whereof I affix my signature.

LEMUEL F. HOWARD.